Patented Aug. 7, 1945

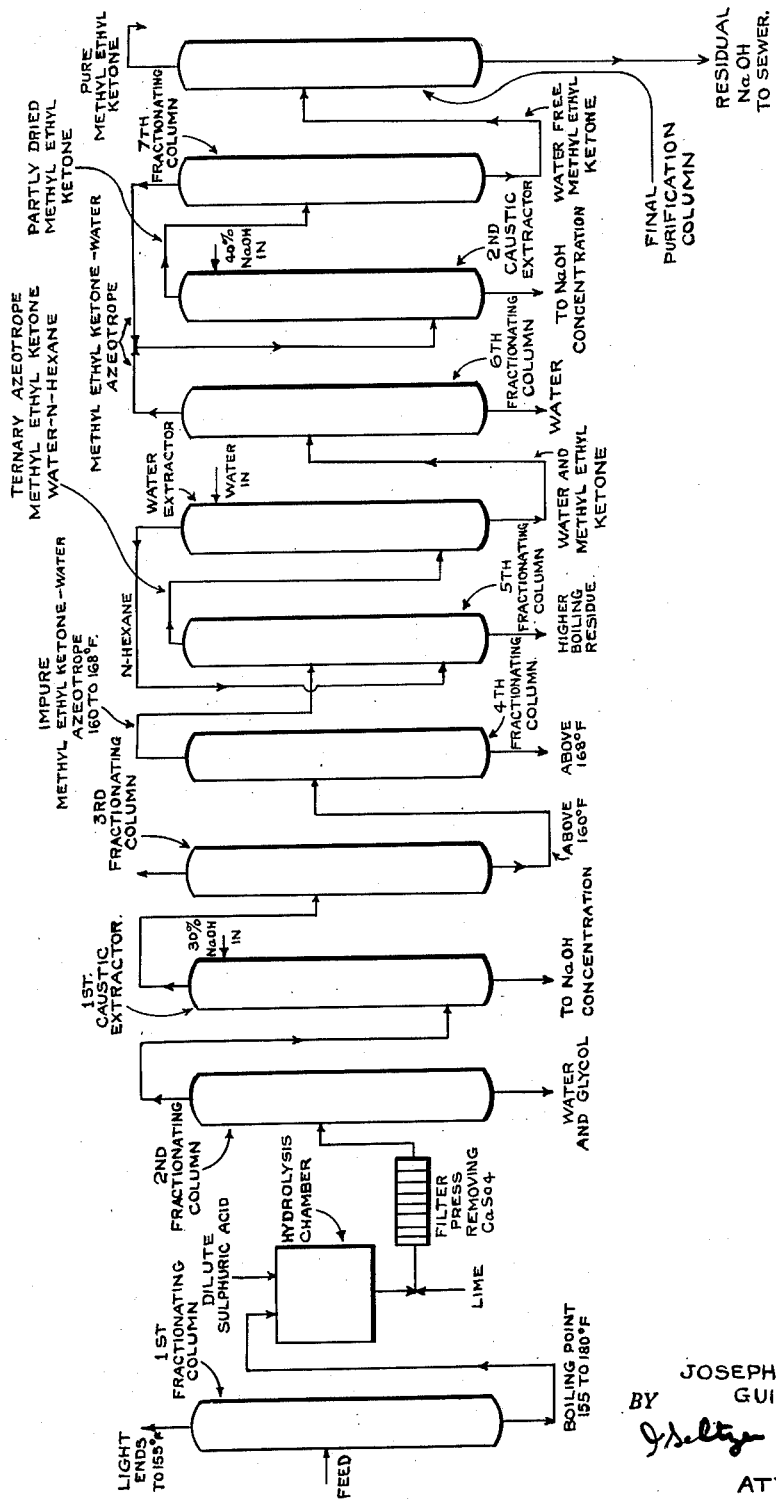

2,381,032

UNITED STATES PATENT OFFICE 2,381,032

SEPARATION OF ORGANIC COMPOUNDS

Joseph E. Bludworth and Guiles Flower, Jr., Cumberland, Md., assignors to Celanese Corporation of America, a corporation of Delaware Application August 6, 1943, Serial No. 497,634

10 Claims. (Cl. 202—42)

This invention relates to the separation of organic compounds and relates more particularly to the separation of the respective components from a mixture of oxygenated organic compounds obtained in the oxygenation of hydrocarbons.

An object of this invention is the separation of a mixture of oxygenated organic compounds obtained in the oxygenation of hydrocarbons into its several components.

Another object of this invention is the economic recovery of methyl ethyl ketone in a highly purified form from a mixture of oxygenated organic compounds including the same by novel azeotropic distillation operations.

Other objects of this invention will appear from the following detailed description.

In the oxygenation of hydrocarbons in accordance with United States Patents Nos. 2,128,908 and 2,128,909, a mixture of products is obtained. The products comprise acetaldehyde, formaldehyde, acetone, methanol, acetals, acids, and cyclic oxides, together with a small amount of methyl ethyl ketone and higher boiling compounds. The lower boiling fractions comprising, for example, acetaldehyde, formaldehyde, acetone and methanol may be stripped from the remaining oxygenation product by a series of distillation operations as is well known in the art. For the process to be economically sound, however, the residue, comprising acids, acetals, cyclic oxides, methyl ethyl ketone and higher boiling compounds must be separated into its several components so that the respective components are each obtained in as pure a form as possible.

We have now found that the mixture of products, remaining after stripping the reaction product obtained by the oxygenation of hydrocarbons of the lower boiling aldehydes, acetone and methanol, may be separated into the several components comprising the residue by a novel purification process. In accordance with my process not only may the respective products be separated, but methyl ethyl ketone, although present in the mixture in small amount, may be economically recoverd therefrom in a high state of purity.

The process of my invention will now be described with reference to the accompanying drawing wherein there is shown in diagrammatic form the flowsheet and apparatus for carrying out our novel process.

Referring now to the drawing, the residue remaining after the lower boiling fractions comprising acetaldehyde, formaldehyde, acetone and methanol have been stripped from the initial oxygenation product, is fed to the first fractionating column where the light ends boiling below about 155° F. are removed. The product discharged at the base of the column has a boiling range of about 155 to 180° F. and comprises acids, acetals, methyl ethyl ketone and higher boiling compounds. This product is piped to a hydrolysis chamber to which from 10 to 35 parts of dilute sulfuric acid per 100 parts of product are added and the mixture formed is heated to about 145° F. for from 1 to 10 hours, usually about 5 hours. The sulfuric acid may be of a concentration of 5 to 15%. This treatment effects the hydrolysis of the acetals and hydrocarbon oxides. The acetals, on hydrolysis, form free aldehydes and alcohols, while the hydrolysis of the hydrocarbon oxides yields polyhydroxy alcohols, i. e. glycols. The free sulphuric acid is then neutralized by the addition of lime, and the calcium sulfate precipitated from solution is removed by means of a filter press.

The neutral liquid filtrate from the filter press is charged into a second fractionating column where the volatile components up to the boiling point of water are removed, water and glycol being discharged at the base of this second fractionating column. The distillate from the second fractionating column is entered into a caustic extractor where it is treated counter-current'y with a 30% aqueous solution of NaOH. The latter removes the remaining alcohols and the aldehydes which were produced by the hydrolysis of the acetals. The caustic solution leaving the base of the first extractor may be concentrated by evaporation for further use.

The material insoluble in the NaOH solution leaves the top of the extractor and is charged to a third fractionating column where the volatile materials boiling up to 160° F. are removed as the distillate. The bottoms, containing methyl ethyl ketone, are charged into a fourth fractionating column and subjected to distillation. The distillate coming from the fourth fractionating column comprises an impure binary azeotropic mixture of methyl ethyl ketone and water which has a boiling point in the range of from 160° F. to 168° F. The liquid removed from the base of the fourth fractionating column boils at above 168° F. and comprises for the greater part unhydrolyzed hydrocarbon oxide. The impure methyl ethyl ketone-water azeotrope is now charged into a fifth fractionating column into which n-hexane is run, and the mixture is distilled. The distillation operation in the fifth fractionating column effects the formation of a ternary azeotrope comprising water, n-hexane and methyl ethyl ketone and this azeotrope boils at about 137° F. at 742.5 mm. pressure. The azeotrope contains 4% by weight of water and the hexane layer contains 22%, based on the weight of the azeotropic mixture, of methyl ethyl ketone. This azeotrope is extracted counter-currently with water in a water extractor, and, since the methyl ethyl ketone is water-soluble, the water dissolves out the methyl ethyl ketone. The n-hexane, being water insoluble as well as of lower specific gravity than the water, leaves at the top of the water extractor and is recirculated to the fifth fractionating column to be employed over again in the distillation of the ternary azeotrope. The solution of methyl ethyl ketone in water coming from the water extractor is charged into a sixth fractionating column and distilled. The distillate from the sixth fractionating column comprises a binary azeotropic mixture of methyl ethyl ketone and water containing about 88% of methyl ethyl ketone and 12% of water. The water which does not come over in the azeotropic mixture is discharged at the base of the column. The azeotrope of methyl ethyl ketone and water is then extracted with a 40% aqueous solution of NaOH in a second caustic extractor. The methyl ethyl ketone is insoluble in the caustic solution and this operation serves to remove a large part of the water. The partially dried methylethyl ketone from the second caustic extractor is then charged into a seventh fractionating column where the remainder of the water together with some of the methyl ethyl ketone is removed as an azeotrope leaving water-free methyl ethyl ketone behind to be removed at the base of the column. The water-free methyl ethyl ketone contains some sodium hydroxide solution and the latter is removed by a fractionation step in the final purification column. The methyl ethyl ketone obtained as a distillate from this column is above 99% in purity.

Besides n-hexane other hydrocarbons which may be employed in forming the ternary azeotrope in the fifth fractionating column are isomeric hexanes such as 2-methyl-pentane and 3-methyl-pentane, and hexenes such as 1-hexene, 2-hexene, 2-methyl-1-pentene, 2-methyl-2-pentene, 3-methyl-2-pentene, and 3-hexene. In lieu of employed concentrated aqueous sodium hydroxide as the extractant, concentrated solutions of potassium hydroxide, or saturated solutions of, for example, potassium carbonate, calcium chloride or sodium thiosulfate may be employed.

The re-concentration of the sodium hydroxide solutions employed for extraction is effected by first subjecting the diluted solution to a distillation step to strip the alcohols, viz., methyl alcohol therefrom. Sufficient water is then distilled off to bring the solution up to the desired concentration, i. e. 30% or 40%, as desired. The concentrated solution is then sent to a settling tank where the resins are skimmed from the top and concentrated caustic soda solution removed at the base. The resinous materials, comprising resinified aldehydes, may be employed in the preparation of adhesive or plastic materials.

It is to be understood that the foregoing detailed description is given merely by way of illustration and that many variations may be made therein without departing from the spirit of our invention.

Having described our invention, what we desire to secure by Letters Patent is:

1. In a process for the recovery of purified methyl ethyl ketone from an impure aqueous solution containing methyl ethyl ketone, the steps which comprise distilling the aqueous solution of methyl ethyl ketone together with a liquid aliphatic hydrocarbon so as to form a heterogeneous ternary azeotrope comprising water, methyl ethyl ketone and the aliphatic hydrocarbon, extracting the ternary azeotrope with water, distilling the extractant and removing the water from the distillate.

2. In a process for the recovery of purified methyl ethyl ketone from an impure aqueous solution containing methyl ethyl ketone, the steps which comprise distilling the aqueous solution of methyl ethyl ketone together with n-hexane so as to form a heterogeneous ternary azeotrope comprising water, methyl ethyl ketone and n-hexane, extracting the ternary azeotrope with water, distilling the extractant and removing the water from the distillate.

3. In a process for the recovery of purified methyl ethyl ketone from an impure aqueous solution containing methyl ethyl ketone, the steps which comprise distilling the aqueous solution of methyl ethyl ketone together with n-hexane so as to form a heterogeneous ternary azeotrope comprising water, methyl ethyl ketone and n-hexane, extracting the ternary azeotrope with water, distilling the extractant so as to form a binary azeotrope comprising water and methyl ethyl ketone, and substantially removing the water from the azeotrope by extracting the azeotrope with a concentrated aqueous solution of an inorganic salt.

4. In a process for the recovery of purified methyl ethyl ketone from an impure aqueous solution containing methyl ethyl ketone, the steps which comprise distilling the aqueous solution of methyl ethyl ketone together with n-hexane so as to form a heterogeneous ternary azeotrope comprising water, methyl ethyl ketone and n-hexane, extracting the ternary azeotrope with water, distilling the extractant so as to form a binary azeotrope comprising water and methyl ethyl ketone, and substantially removing the water from the binary azeotrope by extracting the azeotrope with a concentrated aqueous solution of sodium hydroxide.

5. In a process for the recovery of purified methyl ethyl ketone from an impure aqueous solution containing methyl ethyl ketone, the steps which comprise distilling the aqueous solution of methyl ethyl ketone together with n-hexane so as to form a heterogeneous ternary azeotrope comprising water, methyl ethyl ketone and n-hexane, extracting the ternary azeotrope with water, distilling the extractant so as to form a binary azeotrope comprising water and methyl ethyl ketone, and removing substantially all the water from the binary azeotrope by extracting the azeotrope with a 40% aqueous solution of sodium hydroxide.

6. In a process for the recovery of purified methyl ethyl ketone from an impure aqueous solution containing methyl ethyl ketone, the steps which comprise distilling the aqueous solution of methyl ethyl ketone together with n-hexane so as to form a heterogeneous ternary azeotrope comprising water, methyl ethyl ketone and n-hexane, extracting the ternary azeotrope with water, distilling the extractant so as to form a binary azeotrope comprising water and methyl ethyl ketone, removing substantially all the water from the binary azeotrope by extracting the azeotrope with a 40% aqueous solution of sodium hydroxide, and purifying the remaining methyl ethyl ketone by distillation.

7. Process for the recovery of purified methyl ethyl ketone from a mixture comprising methyl ethyl ketone, acetals, acids, cyclic oxides and other higher boiling oxygenated compounds, which comprises subjecting the mixture to hydrolysis to hydrolyze the acetals to aldehydes and alcohols and some hydrocarbon oxides to glycols, removing some of the water and alcohols formed by fractionation, subjecting the distillate from the fractionation step to counter-current extraction with a concentrated aqueous solution of an inorganic salt, distilling the extracted solution so as to form a binary azeotrope comprising water and methyl ethyl ketone, distilling said binary azeotrope with a liquid aliphatic hydrocarbon so as to form a ternary azeotropic distillate comprising water, methyl ethyl ketone and hydrocarbon, extracting the ternary azeotrope with water to extract the methyl ethyl ketone and yield an aqueous solution comprising methyl ethyl ketone and water, subjecting the latter solution to distillation to effect the formation of a distillate comprising a binary methyl ethyl ketone-water azeotrope, removing a substantial proportion of the water from the binary azeotropic distillate by extracting the latter counter-currently with concentrated aqueous solution of an inorganic salt, and stripping the water from said extracted solution by distillation.

8. Process for the recovery of purified methyl ethyl ketone from a mixture comprising methyl ethyl ketone, higher acetals, acids, cyclic oxides and other oxygenated compounds, which comprises subjecting the mixture to hydrolysis to hydrolyze the acetals to aldehydes and alcohols and some hydrocarbon oxides to glycols, removing some of the water and alcohols formed by fractionation, subjecting the distillate from the fractionation step to counter-current extraction with a concentrated aqueous solution of sodium hydroxide, distilling the extracted solution so as to form a binary azeotrope comprising water and methyl ethyl ketone, distilling said binary azeotrope with n-hexane so as to form a ternary azeotropic distillate comprising water, methyl ethyl ketone and n-hexane, extracting the ternary azeotrope with water to extract the methyl ethyl ketone and yield an aqueous solution comprising methyl ethyl ketone and water, subjecting the latter solution to distillation to effect the formation of a distillate comprising a binary methyl ethyl ketone-water azeotrope, removing a substantial proportion of the water from the binary azeotropic distillate by extracting the latter counter-currently with concentrated aqueous sodium hydroxide, and stripping the water from said extracted solution by distillation.

9. Process for the recovery of purified methyl ethyl ketone from a mixture comprising methyl ethyl ketone, higher acetals, acids, cyclic oxides and other oxygenated compounds, which comprises subjecting the mixture to hydrolysis with an inorganic acid to hydrolyze the acetals to aldehydes and alcohols and some hydrocarbon oxides to glycols, neutralizing the excess acid, removing some of the water and alcohols formed by fractionation, subjecting the distillate from the fractionation step to counter-current extraction with a concentrated aqueous solution of sodium hydroxide, distilling the extracted solution so as to form a binary azeotrope comprising water and methyl ethyl ketone, distilling said binary azeotrope with n-hexane so as to form a ternary azeotropic distillate comprising water, methyl ethyl ketone and n-hexane, extracting the ternary azeotrope with water to extract the methyl ethyl ketone and yield an aqueous solution comprising methyl ethyl ketone and water, subjecting the latter solution to distillation to effect the formation of a distillate comprising a binary methyl ethyl ketone-water azeotrope, removing a substantial proportion of the water from the binary azeotropic distillate by extracting the latter counter-currently with concentrated aqueous sodium hydroxide, and stripping the water from said extracted solution by distillation.

10. Process for the recovery of purified methyl ethyl ketone from a mixture comprising methyl ethyl ketone, higher acetals, acids, cyclic oxides and other oxygenated compounds, which comprises subjecting the mixture to hydrolysis with an inorganic acid to hydrolyze the acetals to aldehydes and alcohols and some hydrocarbon oxides to glycols, neutralizing the excess acid, removing some of the water and alcohols formed by fractionation, subjecting the distillate from the fractionation step to counter-current extraction with a concentrated aqueous solution of sodium hydroxide, distilling the extracted solution so as to form a binary azeotrope comprising water and methyl ethyl ketone, distilling said binary azeotrope with n-hexane so as to form a ternary azeotropic distillate comprising water, methyl ethyl ketone and n-hexane, extracting the ternary azeotrope with water to extract the methyl ethyl ketone and yield an aqueous solution comprising methyl ethyl ketone and water, subjecting the latter solution to distillation to effect the formation of a distillate comprising a binary methyl ethyl ketone-water azeotrope, removing a substantial proportion of the water from the binary azeotropic distillate by extracting the latter counter-currently with concentrated aqueous sodium hydroxide, and stripping the water from said extracted solution by distillation.

JOSEPH E. BLUDWORTH.
GUILES FLOWER, Jr.